US012783263B2

(12) United States Patent
Sun et al.

(10) Patent No.: US 12,783,263 B2
(45) Date of Patent: Nov. 3, 2026

(54) KEYBOARD-BASED DISPLAY INTERFACE CONTROL SYSTEM AND DISPLAY METHOD

(71) Applicants: Digiwin Software Co., Ltd, Shanghai (CN); DATA SYSTEMS CONSULTING CO., LTD., New Taipei City (TW)

(72) Inventors: Guoxin Sun, Shanghai (CN); Yihai Gao, Shanghai (CN); Xianxian Xu, Shanghai (CN); Jinxin Shi, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 252 days.

(21) Appl. No.: 18/398,095

(22) Filed: Dec. 27, 2023

(65) Prior Publication Data

US 2025/0060977 A1 Feb. 20, 2025

(30) Foreign Application Priority Data

Aug. 15, 2023 (CN) ......................... 202311030507.7

(51) Int. Cl.
*G06F 9/451* (2018.01)

(52) U.S. Cl.
CPC .................................... *G06F 9/451* (2018.02)

(58) Field of Classification Search
CPC ................................... G06F 9/451; G06F 8/38
See application file for complete search history.

(56) References Cited

U.S. PATENT DOCUMENTS 6,774,786 B1 * 8/2004 Havekost ........... G05B 23/0272 700/83
9,529,522 B1 * 12/2016 Barros ................ G06F 16/9538
10,739,983 B1 * 8/2020 Miriyala ............. G06F 3/04817
2007/0129112 A1 * 6/2007 Tarn .................. H04M 1/72436 455/566
2014/0095964 A1 * 4/2014 Mayblum ............. G06F 16/958 715/201
2016/0034576 A1 * 2/2016 Jiang ................. G06F 16/24565 707/702
2017/0329483 A1 * 11/2017 Jann ....................... G06F 40/106
2019/0324825 A1 * 10/2019 Schwartz ............ G06F 3/04842

(Continued)

*Primary Examiner* — Daniel W Parcher
(74) *Attorney, Agent, or Firm* — JCIPNRET

(57) ABSTRACT

A display interface control system and a display interface control method are provided. The display interface control system includes a first server, a second server and a database. The first server communicates with a terminal device, and is configured to receive interface configuration information sent by the terminal device. The second server communicates with the first server and is configured to receive the interface configuration information. The second server generates a data request to the database according to the interface configuration information, and the database returns corresponding keyword data to the first server according to the data request. The first server constructs interface display data according to the keyword data, and provides the interface display data to the terminal device, so that a browser of the terminal device renders and displays a corresponding page according to the interface display data.

12 Claims, 10 Drawing Sheets

(56) References Cited

U.S. PATENT DOCUMENTS

| | | | | |
|---|---|---|---|---|
| 2020/0127604 | A1* | 4/2020 | Kosharovsky .......... | H02S 50/00 |
| 2022/0108276 | A1* | 4/2022 | Stringham .............. | G06F 9/451 |
| 2023/0315492 | A1* | 10/2023 | Caliskanoglu .......... | G06F 9/451 |

* cited by examiner

Function:

```
[
  {
    "id": "643529a68b65b31fc726ef29",
    "code": " purchaser ",
    "name": " purchaser "
  },
  {
    "id": "643529a68b65b31fc726ef2a",
    "code": " purchasing_manager "
    "name": " purchase manager "
  },
  {
    "id": "643529a68b65b31fc726ef2b",
    "code": " warehouse_keeper ",
    "name": " warehouse manager "
  },
  {
    "id": "643529a68b65b31fc726ef2c",
    "code": " manager_director ",
    "name": " general manager "
  }
]
```

401

FIG. 4A

402

```
RelationFunctionWord
[
  {
    // purchaser
    "functionId ": "643529a68b65b31fc726ef29",
    // purchase order number
    "wordId ": "641d75074ae9d91a96561e26",
  },
  {
    // purchaser
    "functionId ": "643529a68b65b31fc726ef29",
    // item no.
    "wordId ": "641d75074ae9d91a96561e24",
  },
  {
    // purchaser
    "functionId ": "643529a68b65b31fc726ef29",
    // item name
    "wordId ": "641d75074ae9d91a96561e25",
  },
  {
    // purchaser
    "functionId ": "643529a68b65b31fc726ef29",
    // purchase quantity
    "wordId ": "641d75074ae9d91a96561e27",
  },
  {
    // purchase manager
    "functionId ": "643529a68b65b31fc726ef2a",
    // purchase order number
    "wordId ": "641d75074ae9d91a96561e26",
  },
  {
    // purchase manager
    "functionId ": "643529a68b65b31fc726ef2a",
    // item no.
    "wordId ": "641d75074ae9d91a96561e24",
  },
  {
    // purchaser
    "functionId ": "643529a68b65b31fc726ef29",
    // item name
    "wordId ": "641d75074ae9d91a96561e25",
  },
  {
    // purchase manager
    "functionId ": "643529a68b65b31fc726ef2a",
    // purchase quantity
    "wordId ": "641d75074ae9d91a96561e27",
  },
  {
    // purchase manager
    "functionId ": "643529a68b65b31fc726ef2a",
    // purchase amount
    "wordId ": "641d75074ae9d91a96561e28",
  },
  {
    // purchase manager
    "functionId ": "643529a68b65b31fc726ef2a",
    // remarks
    "wordId ": "641d75074ae9d91a96561e2a",
  }
]
```

FIG. 4B

```
Scene:
[
  {
    "id": 64253b1e1f419e1c2051b71e",
    "code": "purchase",
    "name":" purchase ",
    "parentId ": null
  },
  {
    "id": 64253b1e1f419e1c2051b71f",
    "code": " purchase_purchase ",
    "name":" purchase ",
    "parentId": 64253b1e1f419e1c2051b71e
  }
  {
    "id": 64253b1e1f419e1c2051b720",
    "code": "inquiry",
    "name":" inquiry ",
    "parentId": 64253b1e1f419e1c2051b71e
  },
  {
    "id": 64253b1e1f419e1c2051b721",
    "code": "inventory",
    "name":" inventory ",
    "parentId": null
  },
  {
    "id": 64253b1e1f419e1c2051b722",
    "code": "stocktaking",
    "name":" inventory check ",
    "parentId": 64253b1e1f419e1c2051b721
  }
]
```

403

FIG. 4C

404

```
RelationSceneWord
[
  {
    // purchase
    "sceneId ": "64253b1e1f419e1c2051b71f",
    // purchase order number
    "wordId ": "641d75074ae9d91a96561e26",
    // natural key
    "featureId ": "641d7404047cec7e5d2dd371"
  },
  {
    // purchase
    "sceneId ": "64253b1e1f419e1c2051b71f",
    // item no.
    "wordId ": "641d75074ae9d91a96561e24",
    // execution object
    "featureId ": "641d7404047cec7e5d2dd373"
  },
  {
    // purchase
    "sceneId ": "64253b1e1f419e1c2051b71f",
    // item no.
    "wordId ": "641d75074ae9d91a96561e25",
    // execution object association attribute
    "featureId ": "641d7404047cec7e5d2dd374"
  },
  {
    // purchase
    "sceneId ": "64253b1e1f419e1c2051b71f",
    // purchase quantity
    "wordId ": "641d75074ae9d91a96561e27",
    // natural key association attribute
    "featureId ": "641d7404047cec7e5d2dd372"
  },
  {
    // purchase
    "sceneId ": "64253b1e1f419e1c2051b71f",
    // purchase amount
    "wordId ": "641d75074ae9d91a96561e28",
    // natural key association attribute
    "featureId ": "641d7404047cec7e5d2dd372"
  }
]
```

FIG. 4D

```
Feature:
[
  {
    "id": "641d7404047cec7e5d2dd371",
    "code": " business_key ",
    "name": " natural key ",
    "sequence": 1
  },
  {
    "id": "641d7404047cec7e5d2dd372",
    "code": " business_key_related_property ",
    "name": " natural key association attribute",
    "sequence": 2
  },
  {
    "id": "641d7404047cec7e5d2dd373",
    "code": " subject_of_execution ",
    "name": " execution object ",
    "sequence": 3
  },
  {
    "id": "641d7404047cec7e5d2dd374",
    "code": " subject_of_execution_related_property ",
    "name": " execution object association attribute ",
    "sequence": 4
  }
]
```

405

FIG. 4E

Word:
[
  {
    "id": "641d75074ae9d91a96561e24",
    "code": " item_no ",
    "name": " item no."
  },
  {
    "id": "641d75074ae9d91a96561e25",
    "code": " item_name ",
    "name": " Item name ",
  },
  {
    "id": "641d75074ae9d91a96561e26",
    "code": " purchase_no ",
    "name": " purchase order number ",
  },
  {
    "id": "641d75074ae9d91a96561e27",
    "code": " purchase_quantity ",
    "name": " purchase quantity ",
  },
  {
    "id": "641d75074ae9d91a96561e28",
    "code": " purchase_amount ",
    "name": " purchase amount ",
  },
  {
    "id": "641d75074ae9d91a96561e29",
    "code": " inventory_quantity ",
    "name": " inventory quantity ",
  },
  {
    "id": "641d75074ae9d91a96561e2a",
    "code": "remark",
    "name": " remarks ",
  }
]

406

FIG. 4F

```
SpecialRule :
[
   {
      "id": "64216ba2fbb2482c9fd1a02b",
      "words": " item_no , item_name "
   }
]
```

407

FIG. 4G

KEYBOARD-BASED DISPLAY INTERFACE CONTROL SYSTEM AND DISPLAY METHOD

CROSS-REFERENCE TO RELATED APPLICATION

This application claims the priority benefit of China application serial no. 202311030507.7, filed on Aug. 15, 2023. The entirety of the above-mentioned patent application is hereby incorporated by reference herein and made a part of this specification.

BACKGROUND

Technical Field

The invention relates to a system of automatically control display content, and particularly relates to a display interface control system and a display interface control method.

Description of Related Art

Display and hiding of fields and an order of the fields in conventional computer programs or website interfaces are implemented by developers through coding, although it was later implemented through configuration to reduce a code development work and reduce an error rate, the configuration method still does not completely solve the problem. In this regard, since relevant function programs of a business system may respectively correspond to a large number of interfaces, and each field of each page still needs to be manually arranged and specified, it has problems of cumbersome coding and excessive data volume. More importantly, consistency between interfaces of various business functions may only be achieved based on experiences of designers.

SUMMARY

The invention is directed to a display interface control system and a display interface control method, which are adapted to automatically adjust content displayed in a display interface.

An embodiment of the invention provides a display interface control system including a first server, a second server and a database. The first server communicates with a terminal device, and is configured to receive interface configuration information sent by the terminal device. The second server communicates with the first server and is configured to receive the interface configuration information. The database communicates with the first server and the second server. The second server generates a data request to the database according to the interface configuration information, and the database returns corresponding keyword data to the first server according to the data request. The first server is configured to construct interface display data according to the keyword data, and provide the interface display data to the terminal device, so that a browser of the terminal device renders and displays a corresponding page according to the interface display data.

An embodiment of the invention provides a display interface control method including following steps: receiving interface configuration information sent by a terminal device through a first server; receiving the interface configuration information through a second server; generating a data request to a database through the second server according to the interface configuration information; returning corresponding keyword data to the first server through the database according to the data request; constructing interface display data through the first server according to the keyword data; providing the interface display data to the terminal device through the first server; and rendering and displaying a corresponding page through a browser of the terminal device according to the interface display data.

Based on the above description, the display interface control system and display interface control method of the invention are adapted to automatically generate display data with appropriate fields based on functional information and business scene information, so that the browser of the terminal device may render and display the corresponding page.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A is a schematic diagram of a data structure of functional information according to an embodiment of the invention.

FIG. 4B is a schematic diagram of a data structure of functional focus keyword information according to an embodiment of the invention.

FIG. 4C is a schematic diagram of the data structure of business scene information according to an embodiment of the invention.

FIG. 4D is a schematic diagram of a data structure of scene focus keyword information according to an embodiment of the invention;

FIG. 4E is a schematic diagram of a data structure of a keyword attribute according to an embodiment of the invention;

FIG. 4F is a schematic diagram of a data structure of sorted fields according to an embodiment of the invention;

FIG. 4G is a schematic diagram of a data structure of special sorting rule information according to an embodiment of the invention.

DESCRIPTION OF THE EMBODIMENTS

Figure 1:
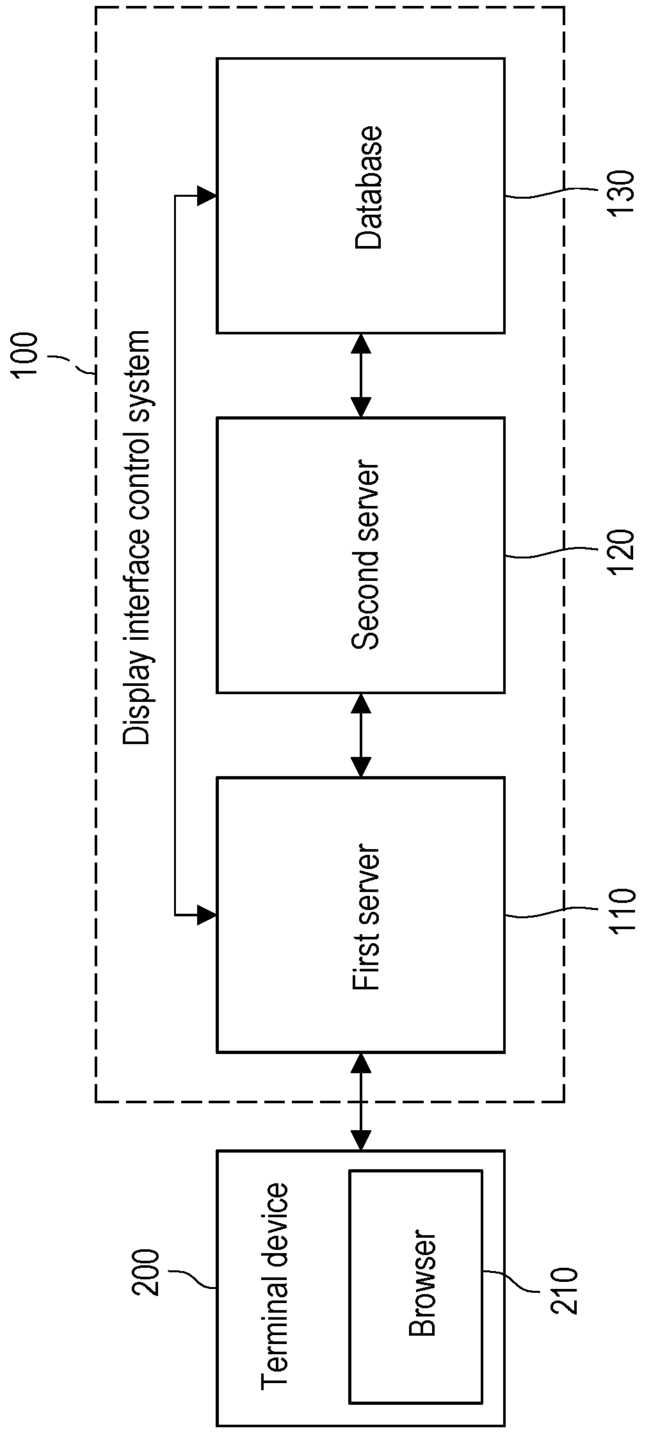
FIG. 1 is a schematic diagram of a display interface control system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a display interface control system according to an embodiment of the invention. Referring to FIG. 1, a display interface control system 100 includes a first server 110, a second server 120 and a database 130. In the embodiment, the first server 110 communicates with the second server 120 and the database 130 through wired or wireless communication. The second server 120 communicates with the database 130 through wired or wireless communication. The first server 110 further communicates with an external terminal device 200 through wired or wireless communication, where the terminal device 200 may execute a browser 210. In the embodiment, the database 130 may be configured as another server. In this regard, in an embodiment, the reason for setting up the first server 110 and the second server 120 separately is that when a traffic of external requests increases or decreases, a capacity of the first server 110 or the second server 120 may be expanded or contracted independently. Or, in another embodiment, when the first server 110 (or the second server 120) is down, and the second server 120 (or the first server 110) still operates normally, it only needs to restart the second server 120 (or the first server 110) or perform other operation and maintenance measures on the same.

In the embodiment, the first server 110 may be used, for example, to execute an enterprise resource planning (ERP) system. The terminal device 200 may be operated by a user or a tenant to connect to the first server 110 through the browser 210, and execute related functions and/or programs of the ERP system to realize related business or management operations. In the embodiment, in the process of providing relevant business functions or programs, the first server 110 may provide display data of the relevant operation page to the terminal device 200 so that the browser 210 may display a corresponding operation page (i.e., display a related page of the ERP). In this regard, the first server 110 may be connected to the second server 120 through a corresponding application interface (API), so as to search the database 130 through the second server 120 to obtain corresponding keyword data. The first server 110 may construct corresponding interface display data according to the keyword data, and provide the interface display data to the terminal device 200, so that the browser 210 of the terminal device 200 may render and display the corresponding page according to the interface display data.

In the embodiment, the first server 110, the second server 120, the database 130 and the terminal device 200 may respectively include a processor and a storage device. The processor may be a system on a chip (SOC), or may include, for example, a central processing unit (CPU) or other programmable general-purpose or special-purpose microprocessor, digital signal processor (DSP), programmable controller, application specific integrated circuits (ASIC), programmable logic device (PLD), other similar processing devices or combination of these devices. In the embodiment, the storage device may be, for example, a dynamic random access memory (DRAM), a flash memory or a non-volatile random access memory (NVRAM), etc. The storage device may be used to store relevant data, programs, algorithms and information for the processor to access and/or execute to implement corresponding functions.

Figure 2:
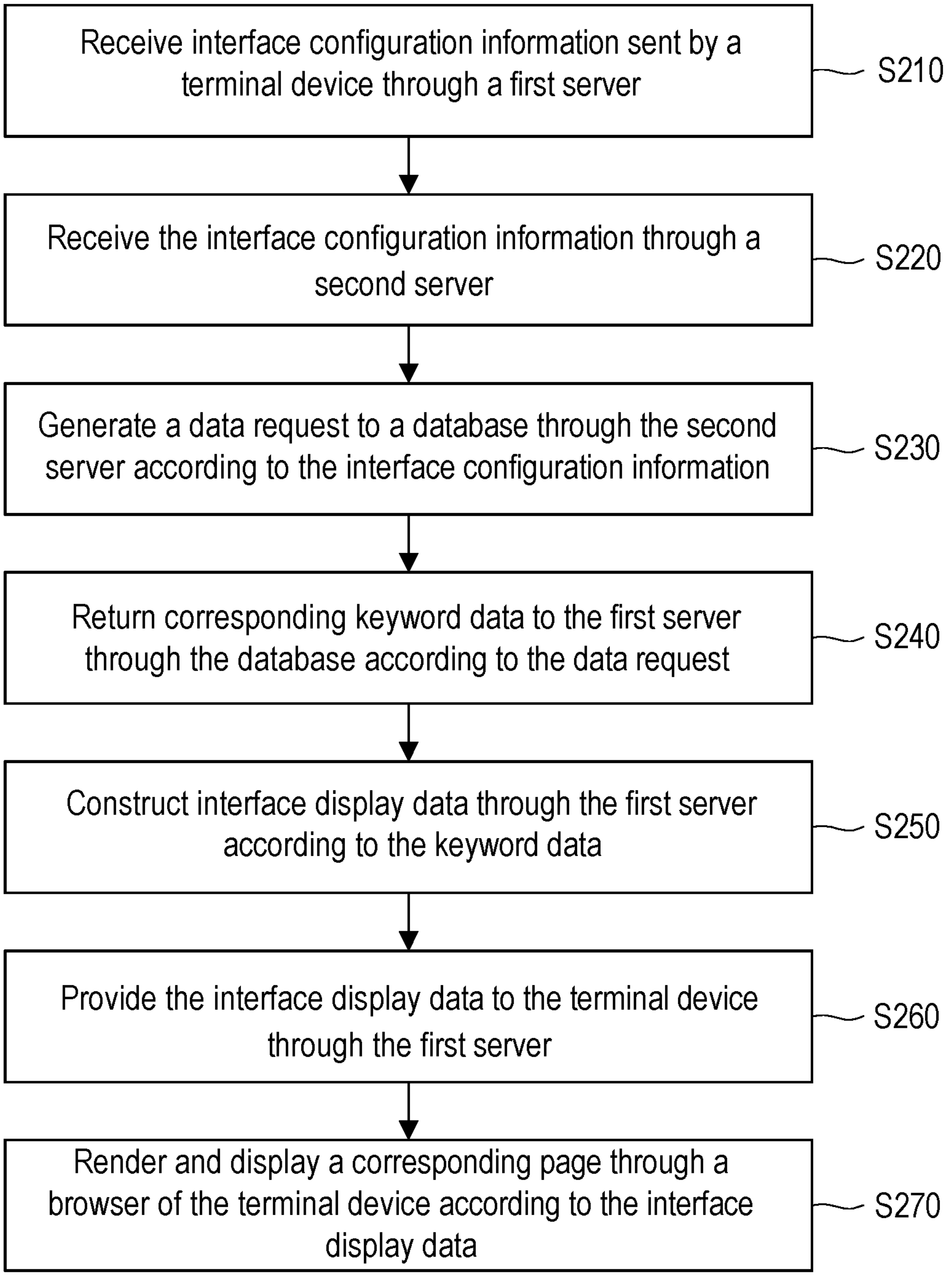
FIG. 2 is a flowchart of a display interface control method according to an embodiment of the invention.

FIG. 2 is a flowchart of a display interface control method according to an embodiment of the invention. Referring to FIG. 1 and FIG. 2, the display interface control system 100 may perform the following steps S210-S270 to implement the display interface control function. In step S210, the first server 110 may receive interface configuration information sent by the terminal device 200. In the embodiment, a user or a tenant may operate the terminal device 200 and input functional information. The terminal device 200 may generate the interface configuration information according to a business scene currently displayed or operated by the browser 210, and output the same to the display interface control system 100 to request corresponding interface display data. The interface configuration information may include functional information and business scene information.

In step S220, the second server 120 may receive the interface configuration information. In step S230, the second server 120 may generate a data request to the database 130 according to the interface configuration information. In step S240, the database 130 may return corresponding keyword data to the first server 110 according to the data request. In the embodiment, the second server 120 may search the database 130 according to the business scene information, and the database 130 returns scene focus keyword information to the first server 110. In step S250, the first server 110 may construct interface display data according to the keyword data. In step S260, the first server 110 may provide the interface display data to the terminal device 200. In step S270, the browser 210 of the terminal device 200 may render and display a corresponding page according to the interface display data. In this regard, the first server 110, the second server 120, the database 130 and the terminal device 200 do not need to store overall screen data of a complete display interface in advance, but automatically select the corresponding keyword data based on the functional information and business scene information to construct the interface display data in real-time. Therefore, the display interface control system 100 and the display interface control method may effectively reduce a data transmission amount and a data storage space. Moreover, when the browser 210 of the terminal device 200 intends to provide a large number of business functions, the display interface control system 100 may efficiently generate a large amount of different display interface data.

Figure 3:
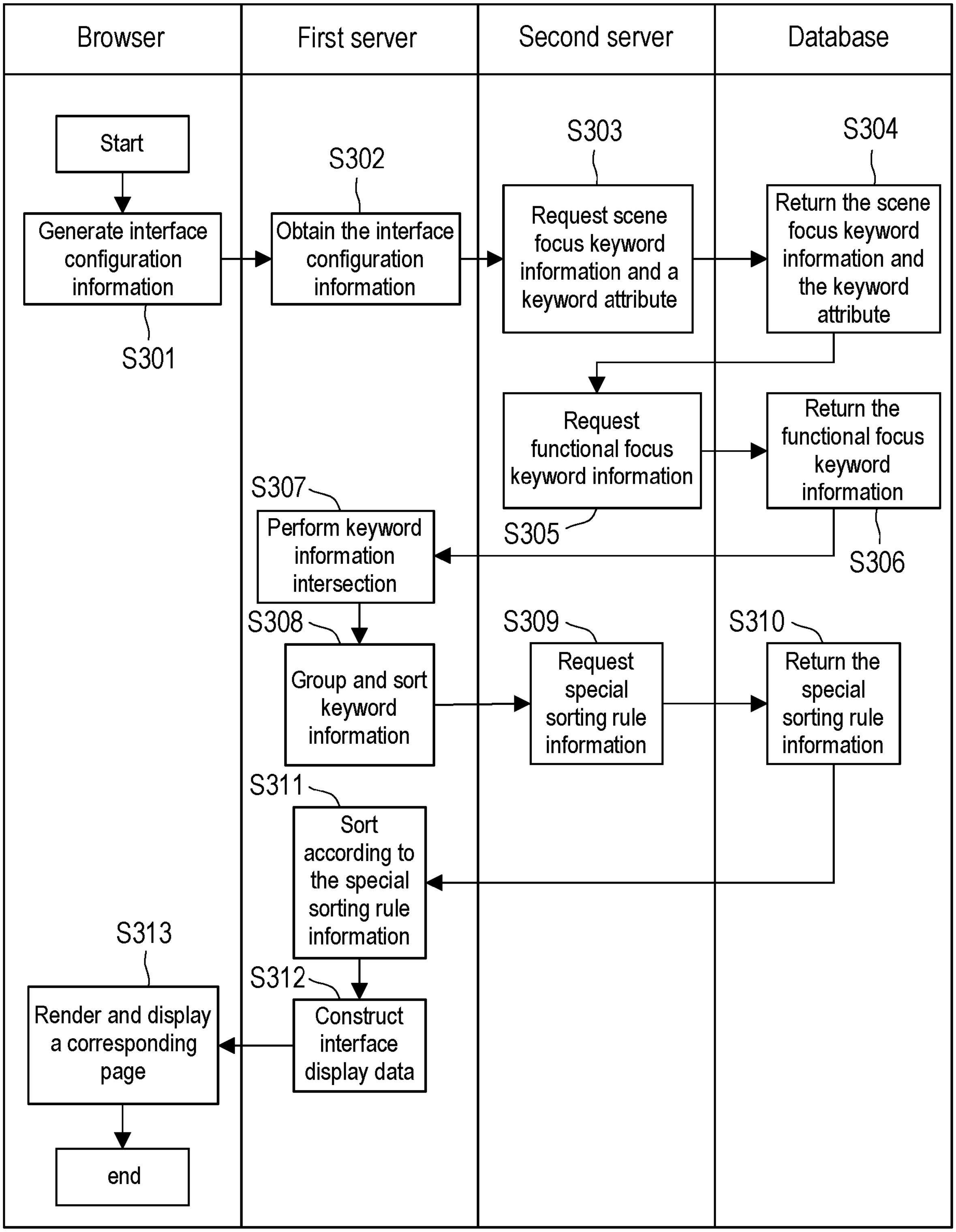
FIG. 3 is a schematic diagram of constructing interface display data according to an embodiment of the invention.

FIG. 3 is a schematic diagram of constructing interface display data according to an embodiment of the invention. Referring to FIG. 1 and FIG. 3, the embodiment further explains in detail the method of constructing interface display data. In step S301, the browser 210 of the terminal device 200 may generate interface configuration information. The interface configuration information may include functional information and business scene information. In step S302, the first server 110 may obtain the interface configuration information. The first server 110 may further send the functional information and the business scene information to the second server 120. In step S303, the second server 120 may request the scene focus keyword information and a keyword attribute from the database 130. The second server 120 may search the database 130 according to the business scene information. In step S304, the database 130 may return the scene focus keyword information and the keyword attribute to the first server 110. In step S305, the second server 120 may request the database 130 for functional focus keyword information. The second server 120 may search the database 130 according to the functional information. In step S306, the database 130 may return the functional focus keyword information to the first server 110.

For example, taking a purchase business scene as an example, the functional information may be implemented as a data structure 401 of "Function" as shown in FIG. 4A. Following data structures 401-407 may be implemented, for example, in a json data format, but the invention is not limited thereto. The functional information may include, for example, one of data (key-value pairs) of ""name": "purchaser"", ""name": "purchase supervisor"", ""name": "warehouse manager"", ""name": "general manager"", and also includes corresponding identity information ("id":) and coding information ("code":).

The database 130 may store corresponding functional focus keyword information, where the functional focus keyword information may be implemented as a data structure 402 of "RelationFunctionWord" as shown in FIG. 4B. The functional focus keyword information may, for example, include multiple pieces of data respectively corresponding to "//purchaser" and "//purchase supervisor" in the data structure 402, where the multiple pieces of data may include a variety of information (functional focus keyword information) types, such as "//purchase order number", "//item no.", "//item name", "//purchase quantity", "//purchase amount" and "//remarks", etc. Taking the function as purchase manager as an example, the database 130 may provide all data of the related functional focus keyword information matching "//purchase manager" in FIG. 4B to the first server 110.

The business scene information may be implemented as a data structure 401 of "Scene" as shown in FIG. 4C. The business scene information may, for example, include data in a data structure 403 ""name":"purchase"", ""name": "inquiry"", ""name":"stock"" and "name":" inventory check"", etc., and also includes corresponding identity information ("id":), coding information ("code":), and parent identity information ("parentId":), etc.

The database 130 may store corresponding scene focus keyword information, where the scene focus keyword information may be implemented as a data structure 404 of "RelationSceneWord" as shown in FIG. 4D. The scene focus keyword information may, for example, include at least one of "//purchase", "//natural key", "//execution object", "//execution object association attributes" and "//natural key association attributes", etc., and further include corresponding information, such as "//purchase order number", "//item no.", "//item name", "//purchase quantity", "//purchase amount". The database 130 may provide all data of relevant scene focus keyword information matching ""name": "purchasing"" in FIG. 4D to the first server 110.

In step S307, the first server 110 may perform keyword information intersection. In step S308, the first server 110 may group and sort the keyword information. In the embodiment, the first server 110 may intersect the scene focus keyword information and the functional focus keyword information to obtain the keyword information to be displayed. The first server 110 may group and sort multiple fields corresponding to the keyword information to be displayed to generate sorted field information. In this regard, the first server 110 may group and sort the intersected field information according to the keyword attribute. In an embodiment, the first server 110 may further intersect an intersection result of the scene focus keyword information and the functional focus keyword information with the keyword information contained in a current page to generate the sorted field information.

For example, the database 130 may store the keyword attribute, where the keyword attribute may be implemented as a data structure 405 of "Feature" as shown in FIG. 4E. The keyword attribute may include, for example, data of ""name": "natural key"", ""name": "natural key associated attribute", ""name": "execution object" and ""name": "execution object association attribute"" in the data structure 405, and also includes the corresponding identity information ("id":), coding information ("code":), and sequence information ("sequence":), etc.

The first server 110 may group and sort the intersected field information according to the keyword attribute, wherein the grouped and sorted result may be realized as the data structure 406 of "Word" as shown in FIG. 4F. The sorted result may include field data arranged in sequence ""name":"item no."", ""name":"item name"", ""name": "purchase order number"", "name": "purchase quantity"", ""name":"purchase amount"", ""name":"inventory quantity"" and ""name":"remarks"", and their corresponding identity information ("id":) and coding information ("code":).

In step S309, the second server 120 may request special sorting rule information from the database 130. In step S310, the database 130 may return the special sorting rule information to the first server 110. In step S311, the first server 110 may sort according to the special sorting rule information.

For example, the database 130 may store the special sorting rule information, where the special sorting rule information may be implemented as a data structure 407 of "SpecialRule" as shown in FIG. 4G. The special sorting rule information may, for example, include identity information ("id":) and field order information ("word":) in the data structure 407, where the field order information is used to indicate that the item no. ("item_no") is displayed first, and then the item name ("item_name") is displayed (for example, a sorting result of FIG. 4F).

In the embodiment, the first server 110 may obtain the special sorting rule information from the database 130 through the second server 120, and the first server 110 may rearrange the sorted field information according to the special sorting rule information. In the embodiment, the first server 110 may sort multiple fields with the same keyword attribute according to the fields specified by the special sorting rule information. In an embodiment, the first server 110 may also sort other multiple fields based on Chinese phonetic alphabet according to the fields that are not specified by the special sorting rule information (for example, a sorting result of the purchase order number, purchase quantity, purchase amount, inventory quantity, and remarks in FIG. 4F).

In step S312, the first server 110 may construct interface display data based on the sorted field information (i.e., to generate Json coding of each field in order, and finally synthesize them into complete data). In the embodiment, the first server 110 may provide the interface display data to the terminal device 200. In step S313, the terminal device 200 may render and display a corresponding page through the browser 210. Specifically, the browser 210 may execute a Json script of the ERP page, where the script may parse the Json coding returned by the server to describe sorting and display hiding, and sequentially generate html elements corresponding to each field, and finally present the same in a display screen of the browser 210. Therefore, the display interface control system 100 may effectively and automatically generate the corresponding display interface data according to a function (or position) of the user or tenant and business scenes, so that the browser 210 of the terminal device 200 may display appropriate interface content.

In summary, the display interface control system and display interface control method of the invention may effectively reduce an amount of data transmission and a data storage space. The server, the database and the terminal equipment of the invention do not need to store the overall screen data of the complete display interface in advance, but automatically select the corresponding keyword data based on the functional information and business scene information to construct the interface display data in real-time. The display interface control system and the display interface control method of the invention may also realize a consistent interface display effect.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A display interface control system, comprising:

a first server, comprising a first processor and a first memory, communicating with a terminal device, and configured to receive interface configuration information sent by the terminal device;

a second server, comprising a second processor and a second memory, communicating with the first server, and configured to receive the interface configuration information; and a database, comprising a third processor and a third memory, communicating with the first server and the second server, wherein the second server generates a data request to the database according to the interface configuration information, and the database returns corresponding keyword data to the first server according to the data request, wherein the interface configuration information comprises functional information and business scene information, wherein the first server is configured to construct interface display data according to the keyword data, and provide the interface display data to the terminal device, so that a browser of the terminal device renders and displays a corresponding page according to the interface display data, wherein the second server searches the database according to the business scene information, and the database returns scene focus keyword information to the first server, wherein the second server searches the database according to the functional information, and the database returns functional focus keyword information to the first server, wherein the first server intersects the scene focus keyword information and the functional focus keyword information to obtain keyword information to be displayed, and the first server groups and sorts a plurality of fields corresponding to the keyword information to be displayed to generate sorted field information, wherein the first server constructs the interface display data according to the sorted field information.

2. The display interface control system as claimed in claim 1, wherein the first server further intersects an intersection result of the scene focus keyword information and the functional focus keyword information with the keyword information contained in the current page to generate the sorted field information.

3. The display interface control system as claimed in claim 1, wherein the first server groups and sorts the intersected field information according to a keyword attribute.

4. The display interface control system as claimed in claim 3, wherein the first server obtains special sorting rule information from the database through the second server, and the first server rearranges the sorted field information according to the special sorting rule information.

5. The display interface control system as claimed in claim 4, wherein the first server sorts a plurality of fields with the same keyword attribute according to the fields specified by the special sorting rule information.

6. The display interface control system as claimed in claim 4, wherein the first server sorts a plurality of other fields based on Chinese phonetic alphabet according to the fields not specified by the special sorting rule information.

7. A display interface control method, comprising:

receiving interface configuration information sent by a terminal device through a first server;

receiving the interface configuration information through a second server;

generating a data request to a database through the second server according to the interface configuration information;

returning corresponding keyword data to the first server through the database according to the data request;

constructing interface display data through the first server according to the keyword data;

providing the interface display data to the terminal device through the first server; and rendering and displaying a corresponding page through a browser of the terminal device according to the interface display data, wherein the interface configuration information comprises functional information and business scene information, wherein the step of returning the corresponding keyword data to the first server through the database according to the data request comprises:

searching the database through the second server according to the business scene information, so that the database returns scene focus keyword information to the first server; and searching the database through the second server according to the functional information, so that the database returns functional focus keyword information to the first server, and wherein the step of constructing the interface display data comprises:

intersecting the scene focus keyword information and the functional focus keyword information through the first server to obtain keyword information to be displayed;

grouping and sorting a plurality of fields corresponding to the keyword information to be displayed by the first server to generate sorted field information; and constructing the interface display data by the first server according to the sorted field information.

8. The display interface control method as claimed in claim 7, wherein the step of obtaining the keyword information to be displayed comprises:

further intersecting an intersection result of the scene focus keyword information and the functional focus keyword information with the keyword information contained in the current page by the first server to generate the sorted field information.

9. The display interface control method as claimed in claim 7, wherein the first server groups and sorts the intersected field information according to a keyword attribute.

10. The display interface control method as claimed in claim 9, wherein the step of generating the sorted field information comprises:

obtaining special sorting rule information from the database by the first server through the second server; and rearranging the sorted field information by the first server according to the special sorting rule information.

11. The display interface control method as claimed in claim 10, wherein the step of rearranging the sorted field information by the first server according to the special sorting rule information comprises:

sorting a plurality of fields with the same keyword attribute by the first server according to the fields specified by the special sorting rule information.

12. The display interface control method as claimed in claim 10, wherein the step of rearranging the sorted field information by the first server according to the special sorting rule information comprises:

sorting a plurality of other fields based on Chinese phonetic alphabet by the first server according to the fields not specified by the special sorting rule information.

* * * * *